Nov. 12, 1940.   M. A. SERTILLANGE   2,221,269
QUICK ACTING OBTURATING FLAP VALVE
Filed Feb. 24, 1938
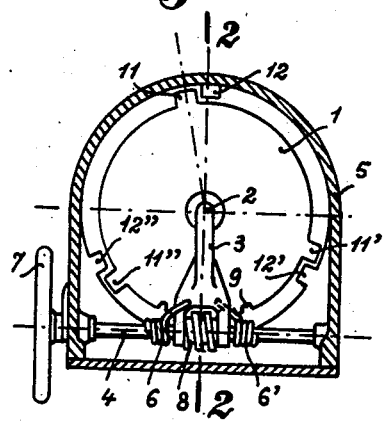
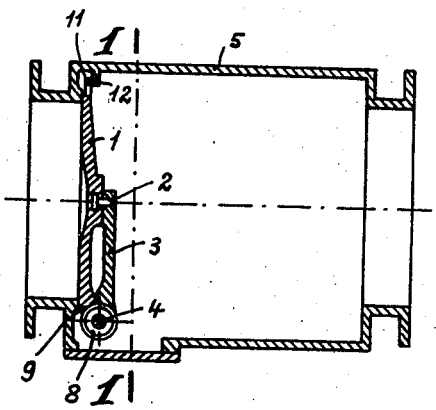
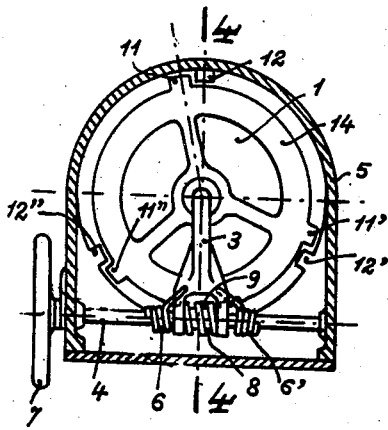
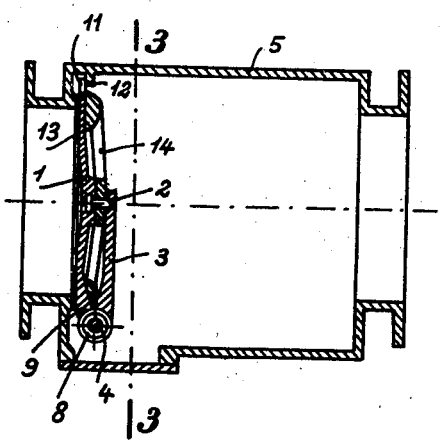
INVENTOR.
Maurice Antoine Sertillange.
BY
ATTORNEY.

Patented Nov. 12, 1940

2,221,269

UNITED STATES PATENT OFFICE 2,221,269

QUICK ACTING OBTURATING FLAP VALVE

Maurice Antoine Sertillange, Brest, France

Application February 24, 1938, Serial No. 192,270
In France February 25, 1937

5 Claims. (Cl. 251—10)

The present invention has for its object improvements in quick acting obturating flap valves, and has for a purpose to improve the working and to simplify the construction of such flap valves used in connection with gas or liquid conduits, for port lights, etc.

According to the invention, the valve is actuated in such a manner that by manoeuvring an operating mechanism in one direction only the valve is given two successive motions, i. e., a displacement which brings the valve on its seat, and a rotary or translated motion which assures a forced contact of this valve on its seat.

Hereafter are described, merely by way of examples, some embodiments of the invention, reference being had to the accompanying drawing which shows:

Fig. 1 a circular flap valve in a sectional view taken on line 1—1 of Fig. 2;

Fig. 2 the flap valve in section taken on line 2—2 of Fig. 1;

Fig. 3 another embodiment of this obturating flap valve in section taken on line 3—3 of Fig. 4;

Fig. 4 a section of this embodiment, taken on line 4—4 of Fig. 3.

In the form shown in Figs. 1 and 2, the valve 1 is mounted on a shaft 2 supported by a lever 3. This lever is mounted freely on a shaft 4, the extremities of which are journaled in the frame 5 of the obturating valve. The actuation of the valve is effected through the medium of supple connecting means, for example by springs 6, 6', in such manner that by turning hand wheel 7 keyed to the shaft 4, in one way or in another, the flap valve is displaced about the axis of the said shaft 4 in a corresponding way. The springs 6 and 6' are wound in opposite directions on the shaft 4 and act in contrary directions upon the lever 3. They are sufficiently strong to operate the valve. To the shaft 4 is keyed a worm 8 engaging teeth 9 cut in a portion of the valve 1. As soon as the valve carried by one of the said springs makes contact with its seat 10, the springs yield and the shaft 4 moves by means of worm 8 the toothed portion 9.

This motion produces a rotation of the valve around its shaft 2 and permits engagement of lugs 11, 11' and 11'' provided on this valve, with respective edged claws 12, 12' and 12'' provided on the valve frame or housing 5 until the keying thus obtained, ensures a forced contact of the valve with its seat.

In this way is obtained, by manoeuvring the wheel 7 for shutting the apparatus, first a circular displacement of the valve about the shaft 4, and then a rotary motion about the axle 2 causing the forced contact of the valve. The inverse manoeuvring causes the valve to open.

According to the embodiment shown in Figs. 3 and 4 the valve 1 is provided on its periphery with a tight joint 13, for example, made of india rubber. The general arrangement is about the same as shown in Figs. 1 and 2, yet an intermediate crown 14 is provided on the axle 2, this crown comprising lugs 11, 11' and 11'' and being partly, at 9, toothed, this toothed part engaging the worm 8 keyed to the shaft 4. The crown 14 moves hence with the shaft 4 and applies the valve against its seat.

It must be understood that the present invention is in no way limited to the embodiments above described and includes many other applications and structures within the scope of the present invention. Likewise the invention is applicable to whatever obturating valves for either purpose, for example, for gas or liquid canalisations or tubings, for port-holes and so on.

What I claim is:

1. In a quick acting obturating device having a valve, a seat for said valve, and a housing for said seat and said valve; said valve adapted to rotate about an axis and relatively to said seat, a rotatable shaft, a hand-wheel to rotate said shaft, a lever articulated to said shaft and carrying said axis and said valve, claws on said housing, lugs on said valve for engagement with said claws, clutching members to connect said shaft with said lever to ensure upon a predetermined rotation of said shaft a corresponding rotation of said valve relatively to said shaft for applying said valve against said seat, and a member fixed on said shaft to rotate said valve in such manner that said lugs force themselves below the said claws to ensure tightness between the valve and its seat.

2. In a quick acting obturating device having a valve, a seat for said valve, and a housing for said seat and said valve; said valve adapted to rotate about an axis and relatively to said seat, a rotatable shaft, a hand-wheel to move said shaft, a lever articulated to said shaft and carrying said axis and said valve, slanted claws on said housing, lugs on said valve for engagement with said claws, springs forming clutching members to connect said shaft with said lever to ensure upon a certain movement of said shaft a rotation of said valve relatively to said shaft for applying said valve against said seat, a member fixed on said shaft to move said valve for forcing its lugs below said claws, said springs being wound in opposite directions on said shaft engaging said lever with one of their extremities in such manner that each spring moves said lever in one direction only upon shaft rotation.

3. In a quick acting obturator having a frame, a circular flap valve provided with teeth on a portion of its periphery and a seat for said valve; said valve adapted to rotate about an axis for engagement of said valve with said seat, a rotatable shaft, a wheel to move said shaft, a lever articulated to said shaft and carrying said axis and said valve, slanted claws on said frame, lugs on said valve to engage below said claws, coupling members to connect said shaft and said lever for ensuring upon a predetermined rotation of said shaft a corresponding rotation of said valve about said shaft to bring said valve against its seat, a central pivot on said lever for receiving said valve, and a worm keyed to said shaft to engage said teeth of said valve, said worm upon rotation of said shaft with respect to said lever imparting to said valve a rotary motion about said axis and forcing thereby said lugs of said valve below said claws to ensure tightness between said flap valve and its seat.

4. In a quick acting obturator having a frame; a circular valve, a valve seat for said valve on said frame, a rotatable shaft, an element for rotating said shaft, lever means articulated to said shaft, coupling means to connect said shaft with said lever means to ensure upon a predetermined rotation of said shaft a corresponding rotation of said valve, a central pivot on one end of said lever means for supporting said valve, a toothed portion on the periphery of said valve, a worm for engagement with said toothed portion, claws on said frame adjacent said valve, and lugs on said valve for engagement with said claws, said worm upon rotation of said shaft with respect to said lever transmitting to said valve a rotating movement about said pivot for enforcing said lugs of said valve below said claws to ensure tightness between said valve and its seat.

5. In a quick acting obturator having a frame; a circular valve, a valve seat for said valve on said frame, a rotatable shaft, an element for rotating said shaft, lever means articulated to said shaft, coupling means to connect said shaft with said lever means to ensure upon a predetermined rotation of said shaft a corresponding rotation of said valve, a central pivot on one end of said lever means, valve tightening means positioned between said valve and said seat, a crown fixed to said valve and rotatable about said pivot, a toothed portion on the periphery of said valve, a worm for engagement with said toothed portion, claws on said frame adjacent said valve, and lugs on said valve for engagement with said claws, said worm upon rotation of said shaft with respect to said lever transmitting to said valve a rotating movement about said pivot for enforcing said lugs of said valve below said claws to ensure tightness between said valve and its seat.

MAURICE ANTOINE SERTILLANGE.